UNITED STATES PATENT OFFICE 2,403,713

PREPARATION OF 4-BASICALLY SUBSTITUTED 2-SULPHANILAMIDOPYRIMIDINES

Jackson P. English, Stamford, Conn., assignor to American Cyanamid Company, New York, N. Y., a corporation of Maine No Drawing. Application July 17, 1944, Serial No. 545,395

6 Claims. (Cl. 260—239.6)

This invention relates to the preparation of sulphanilamido pyrimidines. More particularly it relates to the preparation of 2-sulphanilamido-4-aminopyrimidines.

I have discovered that when 2-sulphanilamido-4-alkoxypyrimidines are heated with ammonia or amines having a reactive hydrogen, reaction occurs resulting in the formation of 2-sulphanilamido-4-(amino or substituted amino) pyrimidines having the following structural formula:

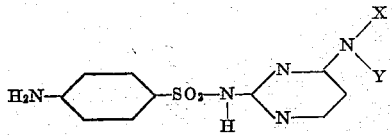

in which X and Y are hydrogen or alkyl and substituted alkyl radicals such as alkoxyalkyl, cyanoalkyl, aralkyl, dialkylaminoalkyl, etc.

It can readily be seen in the above formula that when the 2-sulphanilamido-4-alkoxypyrimidine is reacted with ammonia, then X and Y are hydrogen; when a primary amine such as methylamine is used, then X is methyl and Y is hydrogen; and when a secondary amine is used such as dimethylamine, both X and Y are methyl.

These compounds are useful as chemotherapeutic agents and, also, as intermediates in the preparation of other compounds.

The present invention is not particularly concerned with the method by which the 2-sulphanilamido-4-alkoxypyrimidine is produced and it may be produced by any suitable process. These compounds have been prepared by reacting p-nitrobenzene sulphonyl chloride with 2-amino-4-alkoxypyrimidines followed by reduction to produce 2-sulphanilamido-4-alkoxypyrimidines.

Illustrative examples of the amines which may be used in carrying out the invention are as follows: methylamine, ethylamine, propylamine, butylamine, isopropylamine, amylamine, hexylamine, phenethylamine, cyanoethylamine, phenoxyethylamine, ethoxyethylamine, diethylaminoisoamylamine, diethylaminopropylamine, dimethylaminopropylamine, dipropylaminopropylamine, dipropylaminobutylamine, etc.

When my invention is carried out using ammonia or a volatile amine, it is preferable to use a solvent such as methanol, ethanol, propanol, butanol, etc., and to conduct the reaction in a closed vessel such as an autoclave.

In carrying out the invention, the amine is heated with a 2-sulphanilamido-4-alkoxypyrimidine such as 2-sulphanilamido-4-methoxypyrimidine, 2-sulphanilamido-4-ethoxypyrimidine, etc., with or without a solvent at a temperature of about 50° C. to about 200° C. for from about one-half hour to about four hours depending on the temperature used. The crude reaction product may be isolated and purified by extraction with dilute alkali, filtration and precipitation from the alkaline solution by neutralization. The crude product may also be purified by suspending it in water, filtering and recrystallizing from aqueous solution.

My invention will now be illustrated in greater detail by means of the following specific examples, which are given for purposes of illustration and are not to be considered as limiting my invention to the particular details described therein.

Example 1

40 parts of 2-sulphanilamido-4-methoxypyrimidine were mixed with 400 parts of methanol and 200 parts of anhydrous ammonia and heated for one hour at 110° C. in an autoclave. After cooling and the release of pressure, the alcohol was evaporated. The 2-sulphanilamido-4-aminopyrimidine was obtained by extraction of the residue with dilute alkali and precipitation from the alkaline solution by neutralization. A yield of 23 parts was obtained melting with decomposition at 269° to 270° C.

Example 2

80 parts of 2-sulphanilamido-4-methoxypyrimidine and 38 parts of γ-diethylaminopropylamine were heated together at 110° C. for 45 minutes. The semi-liquid reaction mixture gave off gas and set to a solid. The reaction product was suspended in water and filtered. The solid 2-sulphanilamido-4-(gamma-diethylaminopropylamino) pyrimidine was crystallized from water and had a melting point of 230° to 232° C.

I claim:

1. A method of preparing 2-sulphanilamido-4-aminopyrimidines which comprises heating together a 2-sulphanilamido-4-alkoxypyrimidine, having the formula

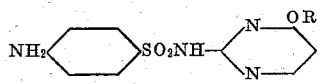

in which R is an alkyl radical, and a member of the class consisting of ammonia, primary amines and secondary amines.

2. A method of preparing 2-sulphanilamido-4-aminopyrimidines which comprises heating together at a temperature between 50° and 200° C., 2-sulphanilamido - 4 - methoxypyrimidine and a member of the class consisting of ammonia, primary amines and secondary amines.

3. A method of preparing 2-sulphanilamidopyrimidines bearing in the 4-position a secondary amino group comprising heating together 2-sulphanilamido-4-methoxypyrimidine and a primary amine.

4. A method of preparing 2-sulphanilamidopyrimidines bearing in the 4-position a tertiary amino group comprising heating together 2-sulphanilamido-4-methoxypyrimidine and a secondary amine.

5. A method of preparing 2-sulphanilamido-4-aminopyrimidine which comprises heating together 2-sulphanilamido - 4 - methoxypyrimidine and ammonia.

6. A method of preparing 2-sulphanilamido-4-($\gamma$-diethylaminopropylamino) pyrimidine which comprises heating together 2-sulphanilamido-4-methoxypyrimidine and $\gamma$-diethylaminopropylamine.

JACKSON P. ENGLISH.